April 17, 1934.                H. FORD                1,955,454
BRAKE
Original Filed Oct. 5, 1927    2 Sheets-Sheet 1
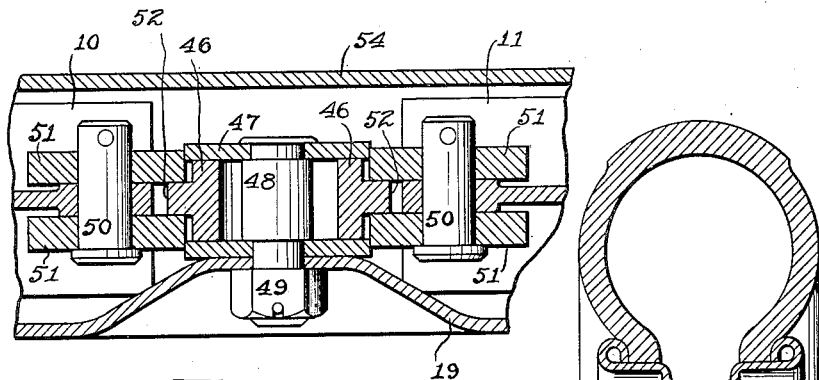
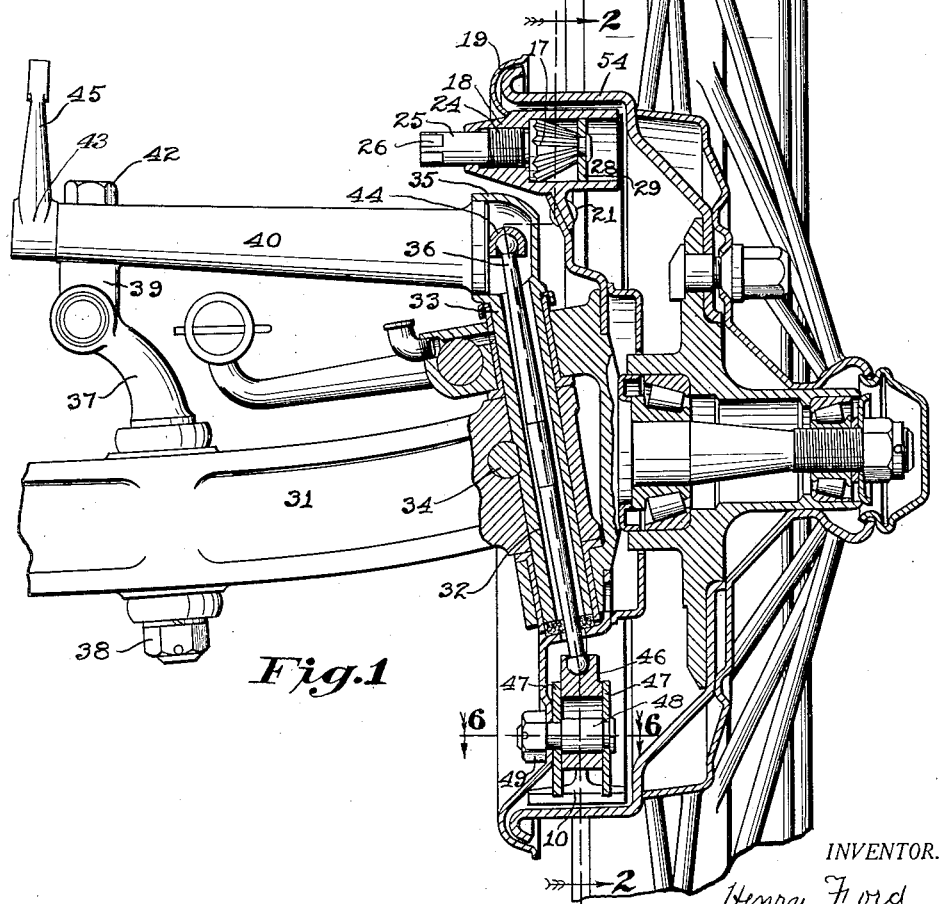
INVENTOR.
Henry Ford.
BY
ATTORNEY.

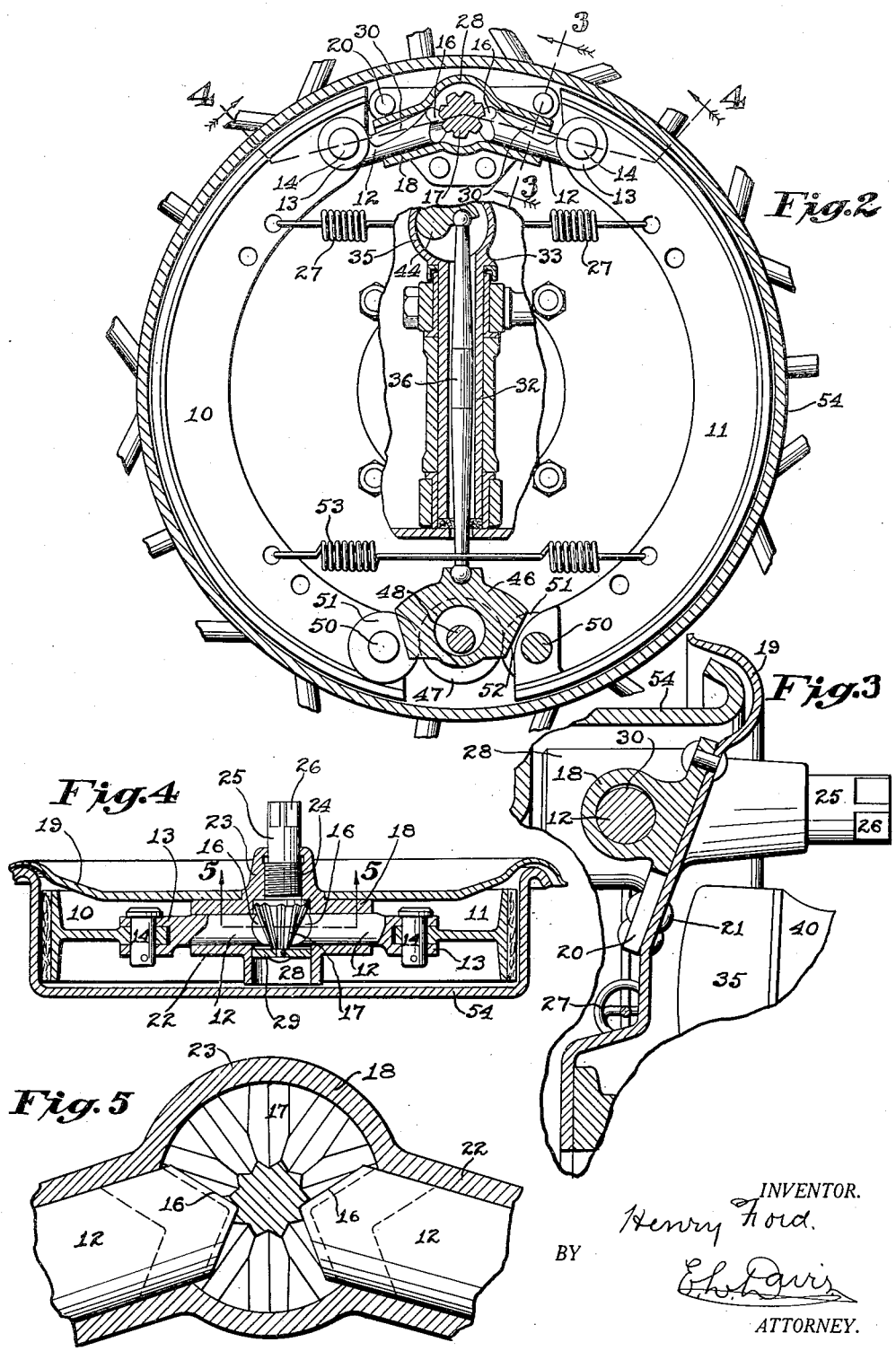

Patented Apr. 17, 1934

1,955,454

UNITED STATES PATENT OFFICE 1,955,454

BRAKE

Henry Ford, Dearborn, Mich., assignor to Ford Motor Company, Dearborn, Mich., a corporation of Delaware Original application October 5, 1927, Serial No. 224,092. Divided and this application November 20, 1929, Serial No. 408,639

8 Claims. (Cl. 188—78)

This present application is a division of my prior application, Serial No. 224,092, filed October 5, 1927.

The object of my invention is to provide a brake of simple, durable, and inexpensive construction.

Still a further object of my invention is to provide a brake which is especially adapted for the front steering wheels of an automotive vehicle.

Still a further object of my invention is to provide such a brake wherein the operating parts are protected from dirt and grease and accidental injury so far as may be possible.

Still a further object of my invention is to provide a novel form of adjusting device for a brake, and to provide in combination with the adjusting device mechanism whereby it is substantially impossible to tighten the brake too much.

Still a further object of my invention is to provide an adjusting device for a brake wherein a cone shaped member may be forced between the ends of the brake to separate the brake ends to thereby adjust the clearance of the brake relative to the brake drum, and to provide in combination with such a cone shaped member, notches whereby the cone may be locked in its adjusted position and whereby it is substantially impossible to adjust the brakes so that they do not have the correct amount of clearance.

Still a further object of my invention is to somewhat loosely mount my improved brake shoe so that engagement of the full length of each brake shoe may be insured whenever the brake is applied even though uneven wear may have occurred on the shoes may not have been perfectly made.

Still a further object of my invention is to provide improved means for protecting the adjusting device against dirt, grease, or water so that there is practically no danger that it will ever wear out, or rust, or get out of order.

Still a further object of my invention is to provide an improved method of applying these brakes, comprising a floating wedge which may be pressed between the free ends of the brake shoes whereby equal and full engagement of both brake shoes may be insured whether they were initially accurately constructed or uneven wear has taken place.

Still a further object of my invention is to provide an improved means for mounting a floating wedge for operating the brake shoes.

With these and other objects in view, my invention consists in the arrangement, construction, and combination of the various parts of my improved device, as described in the specification, claimed in the claims, and illustrated in the accompanying drawings, in which:

Figure 1 shows a vertical central sectional transverse view through a front or steering wheel having my improved brake installed thereon.

Figure 2 shows a vertical sectional view taken on the line 2—2 of Figure 1.

Figure 3 shows a detailed sectional view taken on the line 3—3 of Figure 2.

Figure 4 shows a detailed sectional view taken on line 4—4 of Figure 2.

Figure 5 shows an enlarged detailed sectional view illustrating the construction of the adjusting device, and Figure 6 shows a horizontal sectional view taken on the line 6—6 of Figure 1.

Referring to the accompanying drawings, I have used the reference numerals 10 and 11 to indicate generally brake shoe members of T cross section. These brake shoe members are similar in all respects and interchangeable, and are provided near each end of each of the vertical webs thereof with openings designed to receive pins for mounting said brakes and operating same. Pairs of openings are provided in this vertical web in position spaced from each of said first openings to receive springs for contracting the brake. Studs 12 are provided at one end with clevices 13, so that a pin 14 may extend through said clevices and the openings at the upper end of the brake shoes 10 and 11 to pivotally connect each of the brake shoes with one of the studs 13. The adjacent ends of the studs 12 are beveled to form a chisel end 16 thereon, which are designed to contact with a conical notched head 17 which forms the adjusting member. A housing 18 is secured to the brake anchor plate 19 by means of laterally extending flanges 20 and rivets 21. The housing has sleeves 22 at either end thereof designed to slidingly receive the studs 12. A third sleeve 23 extends from the housing 18 in substantially the same horizontal plane as the sleeves 22 but with its axis perpendicular thereto. The interior of this sleeve 23 is threaded as at 24 to co-act with corresponding threads on the shank 25 of the adjusting member. This shank 25 is preferably formed integrally with the adjusting member 17 and extends through and beyond the brake anchor plate 19 so that the squared end 26 thereof may be rotated by a wrench or other tool to adjust the adjusting member laterally by means of the threads 24.

From the foregoing description it will be seen that the shank 25 of the adjusting member may be rotated to adjust the notched cone 17 axially to thereby spread the studs 12 and consequently the upper ends of the brake shoes 10 and 11 or to permit these studs to approach each other. These studs 12 are normally yieldingly urged into engagement with the cone by the spring 27.

A fourth sleeve 28 extends from the housing 18 at the side thereof opposite the sleeve 23, this sleeve 28 being of greater diameter than the adjusting cone 17 and having its axis coinciding with or registering with the axis of the shank 25 and sleeve 23. A washer 29 is riveted to an extending end of the adjusting cone 17, this washer being of substantially the same diameter as the interior of the sleeve 28. When the adjusting member 17 is in place in the housing 18 it will be seen that the sleeve 28 and washer 29 will form a dust shield at one end of the adjusting cone to thereby protect same from harmful extraneous matter. The outside end of the sleeve 23 is contracted in around the shank 25 to fit closely against same to prevent harmful extraneous matter from entering the adjusting mechanism at the opposite end of the adjusting member. The threads 24 are therefore thoroughly protected against becoming inoperative from causes such as rust, dirt, etc.

The upper sides of the studs 12 within the sleeves 22 are flattened out or relieved as is indicated at 30 in the drawings so that some vertical play of the ends of the brake shoes 10 and 11 is permitted. This is a very important feature of the brake as this little vertical movement of the upper ends of the brake when the pressure is applied thereto makes the difference between a nice operating brake and one which does not operate very satisfactorily. The reason for the superior efficiency of this construction is probably that there is a slight wedging action at the end of the brake shoe against the brake drum due to said end swinging on a pivot, the axis of which is the point of contact of the chisel ends 16 of the studs 12 against the adjusting cone 17.

It will be noted that the adjusting cone 17 is provided with a plurality of serrations into which the chisel ends 16 of the studs 12 are pressed by the spring 27. This construction has two advantages in that it provides a locking means which prevents the brake adjustment from altering during service and prevents the brake from being adjusted too tightly as the engagement of the brake shoes 10 and 11 with the drum when the studs are passing over the shoulders between the notches in the member 17 will prevent the adjustment from being made too tight. In other words, the adjustment is accomplished by screwing the shank 25 until the energy required is considerably greater, due to the engagement of the shoes with the drum when the studs are passing over said shoulders so that the proper adjustment is automatically indicated to the operator. If desired, the notches in the member 17 may be deep enough so that it is impossible to adjust the brakes too tight.

The front axle 31 of the automobile has a hollow sleeve 32 at the end thereof. A hollow king bolt 33 is locked into this sleeve 32 by means of a flat sided pin 34. The upper end of the king bolt 33 is provided with a housing 35 which is open at the inner side thereof. A brake operating rod 36 extends through this hollow king bolt 33 and is provided with a ball at either end thereof. A spring perch 37 extends from the axle 31 and is secured thereto by a nut 38. This spring perch 37 has an extension or boss 39 thereon designed to support one end of the sleeve 40. This sleeve 40 has an extension thereon through which a cap screw 42 may pass so that the cap screw 42 may enter the boss 39 and locate and support the inner end of the sleeve 40. The second end of the sleeve 40 enters the open side of the housing 35.

Rotatably mounted in the sleeve is a brake operating shaft 43 which is provided at its outer end with a cam 44 designed to co-act with a brake operating rod 36 to reciprocate same when the brake operating shaft 43 is rotated. The inner end of the brake operating shaft 43 has an arm 45 secured thereto so that the shaft 43 may be rotated by any suitable connections with brake pedals or brake levers mounted on a chassis.

A floating wedge 46 is connected to the ball at the lower end of the brake operating rod 36. This wedge 46 is prevented from lateral movement by the engagement of the ends thereof with spaced parallel retaining plates or washers 47. These plates are mounted on a stud 48 which is secured by a nut 49 to the brake anchor plate 19. The central portion of the stud 48 is enlarged so that the retaining plates 47 may bear against the shoulders at the ends of the enlarged portion and will be held in place thereby.

A pin 50 extends through the openings at bottom of brake shoes in the vertical webs thereof and a pair of rollers 51 are mounted on each pin 50. The wedge 46 is provided with a central rib 52 which extends between the roller 51 of each brake shoe to thereby prevent lateral movement of the brake shoe. The shoulders on each side of this rib 52 form the cam or working faces of the wedge 46 and engage the peripheries of the rollers 51 to spread the brake shoes and thereby actuate the brake mechanism. It will be noted that the rollers 51 are wide enough to engage both the cam surfaces of the wedge 46 and the edge of the washers 47. These washers 47 are fixed in place on the brake anchor plate 19, so that a spring 53 extended between the brake shoes 10 and 11 draws the rollers 51 into contact with the washers 47 when the brake is in retracted position to thereby insure that the brake shoes will always be centralized relative to the brake drum 54 when they are in their retracted position. Whenever the wedge 46 is pushed downwardly to engage the brake, however, it floats enough to move toward either of the brake shoes 10 or 11 so that if either of these shoes are not quite accurately made or uneven wear has taken place, then the wedge 46 may float sufficiently to apply an equal pressure to both brake shoes 10 and 11. That is, the operating mechanism for the brake is so arranged that it is positively urged into contact with the brake drum but provision is made to equalize the irregularities of the brake shoes, and at the same time there is a positive stop against which the brake shoes are retracted so that the brake shoes will always be centralized with the drum when they are in their inoperative position.

Among the many advantages that result from the use of my improved brake mechanism, it should be pointed out first that I have constructed a brake such that the full working surfaces of both shoes will be fully and equally pressed into engagement with the drum when the brake is being operated so that I am able to secure the maximum efficiency of the brake shoes used. Another advantage results from the fact that the brake is made so that it is not at all likely to be adjusted so that it is too tight, and it can be made so that it cannot be adjusted so that the brake is too tight. Still a further advantage results from the construction whereby the upper ends of the brake shoes are mounted on a swinging pivot so that they can swing into full engagement with the brake drum whereby the friction on the working surface of the brake shoes can be uniform throughout their length. Still a further advantage results from the use of the floating wedge for spreading the brake shoes so that the brakes may be evenly applied even though they were not accurately initially formed or have worn unevenly. Still a further advantage results from the use of positive stop for the brake shoes both at the top and bottom thereof in combination with springs designed to yieldingly urge the brake shoes into contact with the stops, whereby the brake shoes are always returned to a central position relative to the drum, and so that the clearances and movements of the various brake operating parts may be small and the brake leverages relatively large whereby an easy operating brake is secured. Still a further advantage results from the use of the tapered wedge which I have provided in that operation of the parts does not tend to vary the adjustment of the brake and provision is made to prevent rust or dirt or the like from preventing operation of the adjustment at any time.

Some changes may be made in the arrangement, construction and combination of the various parts of my improved device without departing from the spirit of my invention, and it is my intention to cover by my claims such changes as may be reasonably included within the scope thereof.

I claim as my invention:

1. In a brake, a brake anchor plate, a stud fixed therein, a pair of washers mounted on said stud in position spaced from each other, a wedge member mounted between said washers for floating movement, a pair of brake shoes each having spaced rollers at the adjacent ends thereof, and means for actuating said wedge, whereby said wedge may engage said rollers to spread said brake shoes and the return movement of the shoes may be stopped by the engagement of said rollers and said washers.

2. In a brake, a brake anchor plate having a pair of opposed brake shoes mounted thereon, spaced rollers secured to each shoe at one of their adjacent ends, operable means coacting with said rollers to apply the brake, and a pair of spaced washers disposed on said anchor plate in position to directly engage said pairs of rollers to support said shoes in their inoperative positions.

3. In a brake, a brake anchor plate having a brake shoe mounted thereon, a pair of spaced rollers secured to one end of said shoe, operable means coacting with said rollers to apply the brake, and a pair of spaced washers disposed on said anchor plate in position to directly engage said rollers to support the brake shoe in its inoperative position.

4. In a brake, a brake anchor plate having a brake shoe mounted thereon, said shoe having a T-shaped cross section with one end of the shoe having rollers rotatably mounted on each side of the web of said section, operable means coacting with said pair of rollers to apply the brakes, and a pair of spaced washers disposed on said anchor plate in position to directly engage said rollers and support the brake shoe in its inoperative position.

5. A device, as claimed in claim 4, wherein said pair of spaced washers have annular peripheries.

6. In a brake, a brake anchor plate having a braking member mounted thereon, a pair of axially spaced surfaces disposed on one end of said braking member, operable means coacting with said surfaces to apply the brake, and a pair of axially spaced members disposed on said anchor plate in position to directly engage said surfaces and support the brake member in its inoperative position.

7. A brake, as claimed in claim 6, wherein said axially spaced surfaces comprise the peripheries of a pair of axially spaced rollers.

8. A brake, as claimed in claim 6, wherein said braking member comprises a brake shoe of T section, and wherein said axially spaced surfaces comprise the peripheries of a pair of axially spaced rollers which are mounted on the respective sides of the web of said shoe.

HENRY FORD.